Sept. 30, 1941.  J. L. DRAKE  2,257,230
GLASS INSPECTION APPARATUS
Filed Feb. 6, 1939  2 Sheets-Sheet 1
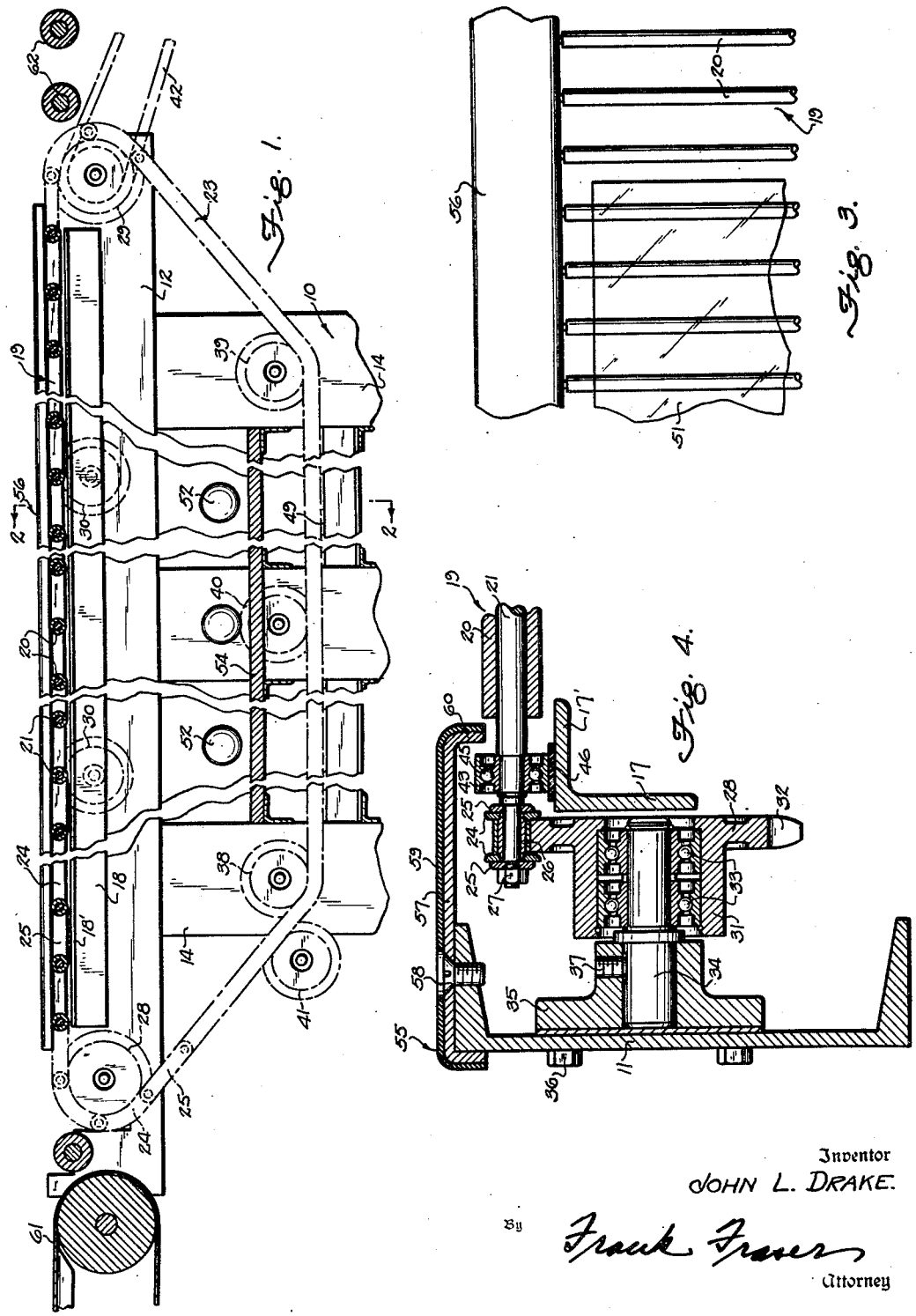
Inventor
JOHN L. DRAKE
By Frank Fraser
Attorney

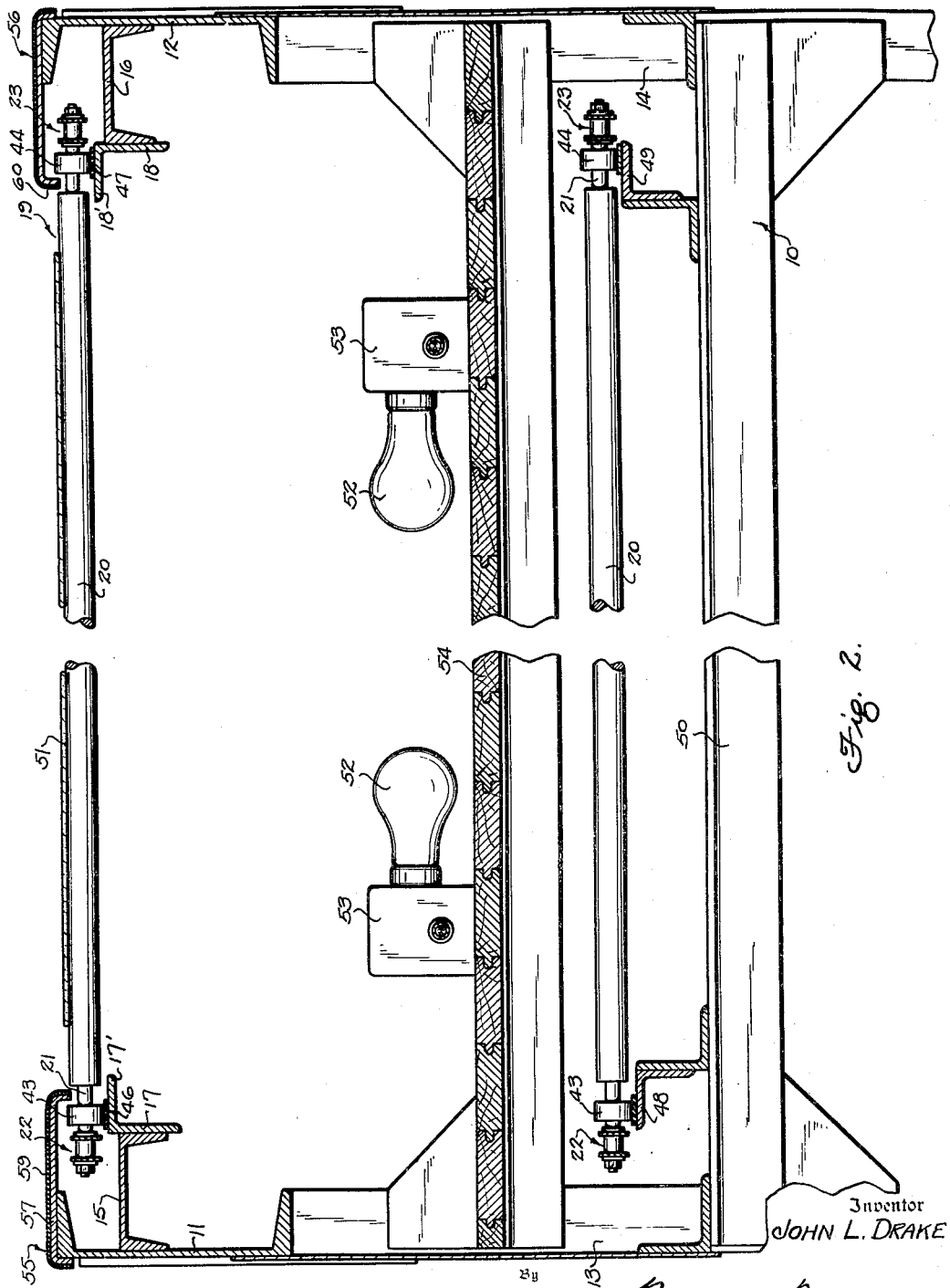

Patented Sept. 30, 1941

2,257,230

UNITED STATES PATENT OFFICE 2,257,230

GLASS INSPECTION APPARATUS

John L. Drake, Toledo, Ohio, assignor to Libbey-Owens-Ford Glass Company, Toledo, Ohio, a corporation of Ohio Application February 6, 1939, Serial No. 254,834

5 Claims. (Cl. 198—183)

The present invention relates to inspection apparatus in general and more particularly to improved apparatus for use in the inspection of sheets or plates of glass.

An important object of the invention is the provision of novel apparatus by means of which the inspection of the glass may be carried out in a rapid and efficient manner as the sheets or plates are carried forwardly past the operator.

Another important object of the invention is the provision of novel apparatus whereby substantially the entire area of the glass sheets or plates may be inspected for both surface and body defects without necessitating the handling of the glass by the operator so as to avoid finger marking or smearing of the glass surfaces as well as minimizing the attendant danger of breaking or scratching the glass.

Other objects and advantages of the invention will become more apparent during the course of the following description, when taken in connection with the accompanying drawings.

In the drawings, wherein like numerals are employed to designate like parts throughout the same:

Fig. 1 is a vertical longitudinal section through inspection apparatus constructed in accordance with the present invention;

Fig. 2 is a vertical transverse section therethrough taken substantially on line 2—2 of Fig. 1;

Fig. 3 is a plan view of a portion of the apparatus; and

Fig. 4 is a detail section through a portion of the apparatus.

The embodiment of the invention illustrated in the drawings comprises a supporting framework 10 including the special longitudinally extending supporting beams 11 and 12 mounted upon the upper ends of vertical legs 13 and 14 respectively. Secured to the inner faces of the supporting beams 11 and 12 are horizontal channel members 15 and 16 respectively carrying the longitudinally extending angle irons 17 and 18. The horizontal flanges 17' and 18' of angle irons 17 and 18 respectively constitute tracks for supporting the upper horizontal run of an endless conveyor which is designated in its entirety by the numeral 19.

The endless conveyor 19 comprises a plurality of spaced, parallel transverse rods 20 mounted upon shafts 21. The shafts 21 project beyond the rods 20 and are connected together at their opposite ends by means of sprocket chains 22 and 23. Each sprocket chain is made up of a plurality of pairs of links 24 and 25 which overlap one another at their ends and are pivotally mounted upon the corresponding ends of two adjacent shafts 21. The links are held apart by spacers 26 carried by the shafts 21 and are secured in place upon the said shafts by nuts 27. Thus, the rods 20 are connected together in endless belt formation by the pairs of links 24 and 25 which pivotally connect the adjacent shafts 21 together.

Each sprocket chain 22 and 23 is trained at the opposite ends of its upper horizontal run about the horizontally spaced sprockets 28 and 29 and may also be supported intermediate its ends by a suitable number of sprockets 30. Each of the sprockets 28, 29 and 30 comprises a cylindrical hub 31 (Fig. 4) provided with sprocket teeth 32 which are received within the spaces between the pairs of links 24 and 25 of the sprocket chains 22 and 23. The hub 31 of the sprocket is rotatably mounted upon ball-bearing assemblies 33 carried by a horizontal stub shaft 34 having its outer end received within a block 35 secured to the respective supporting beam 11 or 12 by screws or the like 36. The stub shaft 34 is fixed against rotation within the block 35 by a set screw or the like 37.

The lower run of each sprocket chain 22 and 23 may be trained over similar sprockets 38, 39, and 40 carried by the supporting framework 10 and held taut by a sprocket 41. The sprocket chains 22 and 23 are adapted to be positively driven by a suitable drive means 42 associated with one of the sprockets, as for example sprocket 29 in Fig. 1.

Loosely mounted upon the opposite ends of each rod shaft 21, inwardly of sprocket chains 22 and 23 respectively, are rollers 43 and 44 which are adapted to travel along the tracks 17' and 18' respectively. As shown in Fig. 4, each roller 43 and 44 is freely rotatable, relative to the shaft 21, upon ball-bearings 45 so that the rollers can run along the tracks while the shafts themselves do not rotate but are carried bodily forwardly. The upper surfaces of the tracks 17' and 18' are preferably provided with strips 46 and 47 of rubber, rubber composition, or the like, upon which the rollers 43 and 44 run. The rollers 43 and 44 in the lower run of the conveyor are adapted to travel along upon the spaced longitudinally extending tracks 48 and 49 carried by the transverse supporting members 50 of the supporting framework 10.

In operation, the glass sheets or plates 51 to be inspected are carried forwardly upon the upper horizontal run of the conveyor 19 and are supported directly upon the rods 20. As the sprocket chains 22 and 23 are positively driven, the rods 20 will be carried bodily forwardly, with the rollers 43 and 44 in the upper run of the conveyor rolling along the tracks 17' and 18' respectively. To facilitate the inspection of the glass as it is carried forwardly, a plurality of electric lamps 52 are arranged beneath the upper run of the conveyor 19 and are adapted to direct light upwardly through the glass sheets. These lamps are fitted within sockets 53 secured to a horizontal floor or deck 54 of wood or metal and which is suitably carried by the supporting framework 10. The invention is of course not restricted to the use of the particular form of artificial lighting means herein disclosed.

The provision of artificial light beneath the path of travel of the glass sheets or plates permits the operator to readily inspect each of the sheets or plates by looking both across and through them. This is done as the glass is carried forwardly past the operator so that the operator can at once detect any defective sheets or plates and readily find any surface or body defects. Also, with this method, the operator is not required to handle the glass during inspection so that the liability of smearing the glass surfaces as well as the danger of breaking or scratching the same is avoided. Furthermore, a single operator can inspect a much larger amount of glass than is possible when he is required to take each sheet or plate and hold it to the light for inspection. Owing to the limited area of the supporting means, practically the entire area of each sheet will be open and unobstructed so that clear vision through the sheets may be obtained of a character which will enable all visible defects to be readily seen. As the rods 20 are carried bodily forwardly and do not rotate about their own axes, there will be no relative movement between the rods and sheets which might result in the marring or scratching of the glass.

Arranged at opposite sides of the endless conveyor 19 are the guard members 55 and 56; each including a substantially horizontal metal plate 57 secured to the respective supporting beam 11 or 12 by screws or the like 58. The upper surface of the plate 57 is preferably covered with rubber, rubber composition, or the like 59 and the inner end thereof is turned downwardly as at 60. The guard members 55 and 56 are provided to protect the operator from the sprockets and sprocket chains while the inner downturned ends 60 thereof prevent the glass sheets or plates 51 from sliding transversely off of the rods 20. Also, the rubber covering 59 reduces the liability of chipping or breaking of the glass sheets should they strike the guard members.

The glass sheets or plates 51 can be placed upon and removed from the endless conveyor 19 by the operator or they can be delivered thereon from an endless conveyor or the like 61 and passed therefrom onto an endless conveyor or a roller runway composed of a series of horizontally aligned rolls 62.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In an apparatus for the inspection of sheets or plates of glass, a conveyor comprising a plurality of spaced parallel rods for supporting the glass sheets or plates, shafts upon which said rods are fixedly mounted, means for connecting said shafts in endless formation so that they have bodily but non-rotatable movement, means for driving said conveyor to move said shafts and rods bodily forwardly, means for supporting the upper run of the conveyor in horizontal position, rollers loosely mounted upon the said shafts and adapted to travel upon said supporting means, and guard members arranged along opposite sides of said conveyor, each guard member comprising a substantially horizontal portion disposed above the respective means for connecting said shafts in endless formation and a downturned inner end portion for preventing the glass sheets or plates from sliding transversely off of said rods.

2. In an apparatus for the inspection of sheets or plates of glass, a conveyor comprising a plurality of spaced parallel rods for supporting the glass sheets or plates, shafts upon which said rods are fixedly mounted, sprocket chains connecting said shafts in endless formation so that they have bodily but non-rotatable movement, means for driving said sprocket chains to move said shafts and rods bodily forwardly, longitudinally extending horizontal tracks for supporting the upper run of the conveyor, rollers loosely mounted upon the said shafts and adapted to travel upon said tracks, and guard members arranged along opposite sides of said conveyor, each guard member comprising a substantially horizontal portion disposed above the respective sprocket chain and a downturned inner end portion for preventing the glass sheets or plates from sliding transversely off of said rods.

3. In an apparatus for the inspection of sheets or plates of glass, a conveyor comprising a plurality of spaced parallel rods, shafts upon which said rods are fixedly mounted, means for connecting said shafts in endless formation so that they have bodily but non-rotatable movement including pairs of links pivotally mounted on the opposite ends of said shafts, sprockets provided with teeth adapted to be received within the spaces between said links, means for driving one of said sprockets to move said shafts and rods bodily forwardly, longitudinally extending horizontal tracks for supporting the upper run of the conveyor, with the glass sheets or plates to be inspected being supported upon said rods, rollers loosely mounted upon the said shafts and adapted to travel upon said tracks, and guard members arranged along opposite sides of said conveyor, each guard member comprising a substantially horizontal portion disposed above the respective means for connecting said shafts in endless formation and a downturned inner end portion for preventing the glass sheets or plates from sliding transversely off of said rods.

4. In an apparatus for the inspection of sheets or plates of glass, a conveyor comprising a plurality of spaced parallel rods for supporting the glass sheets or plates, shafts upon which said rods are fixedly mounted, sprocket chains connecting said shafts in endless formation so that they have bodily but non-rotatable movement, means for driving said sprocket chains to move said shafts and rods bodily forwardly, means for supporting the upper run of the conveyor in substantially horizontal position, rollers loosely mounted upon the said shafts inwardly of said sprocket chains and adapted to travel upon said supporting means, and guard members arranged along opposite sides of said conveyor, each guard member comprising a substantially horizontal portion disposed above the respective sprocket chain and a downturned inner end portion for preventing the glass sheets or plates from sliding transversely off of said rods.

5. In an apparatus for the inspection of sheets or plates of glass, a conveyor comprising a plurality of spaced parallel rods for supporting the glass sheets or plates, shafts upon which said rods are fixedly mounted, sprocket chains connecting said shafts in endless formation so that they have bodily but non-rotatable movement, means for driving said sprocket chains to move said shafts and rods bodily forwardly, means for supporting the upper run of the conveyor in substantially horizontal position, rollers loosely mounted upon said shafts inwardly of said sprocket chains and adapted to travel upon said supporting means, and guard members arranged along opposite sides of said conveyor, each guard member comprising a substantially horizontal portion disposed above the respective sprocket chain and a downturned inner end portion for preventing the glass sheets or plates from sliding transversely off of said rods.

JOHN L. DRAKE.